United States Patent [19]

Sato

[11] Patent Number: 4,491,887
[45] Date of Patent: Jan. 1, 1985

[54] MODE SELECTOR OF RECORDING AND/OR REPRODUCING APPARATUS

[75] Inventor: Seiji Sato, Yokohama, Japan

[73] Assignee: Sony Corporation, Tokyo, Japan

[21] Appl. No.: 405,430

[22] Filed: Aug. 5, 1982

[30] Foreign Application Priority Data

Aug. 13, 1981 [JP] Japan ................. 56-127213

[51] Int. Cl.³ ................. G11B 15/18; G11B 19/02
[52] U.S. Cl. ................. 360/90; 360/69; 360/137
[58] Field of Search ......... 360/90, 93, 96.1, 96.3–96.4, 360/69, 105, 137, 61–62

[56] References Cited

U.S. PATENT DOCUMENTS 4,225,894  9/1980  Fulukawa et al. ............ 360/137
4,232,349 11/1980  Kobayashi ................... 360/105
4,253,123  2/1981  Hayashi et al. .............. 360/137 X
4,404,610  9/1983  Koizumi et al. .............. 360/90 X
4,420,783 12/1983  Suezawa et al. ............. 360/90 X Primary Examiner—John H. Wolff
Attorney, Agent, or Firm—Lewis H. Eslinger; Alvin Sinderbrand

[57] ABSTRACT

A stop/drive mode selector for a tape recording/playback device is capable of feather-touch operation by the plunger of a low power microsolenoid operating through a system of levers and springs. A pinch roller is mounted to a rotatable pinch roller lever. A pivotable drive roller lever, biased by a drive spring, is connected to the pinch roller lever by an interlocking lever. When a locking lever is released by actuating the solenoid, the drive spring, through the drive lever and interlocking lever, rotates the pinch roller lever to bring the pinch roller into contact with the constantly rotating capstan, which thereby drives the tape. When the interlocking lever is rotated by a second stroke of the solenoid plunger, a cam mechanism on the interlocking lever rotates the pinch roller lever to move the pinch roller away from the capstan, stopping the tape and allowing the drive spring to further rotate the drive lever. An eccentric gear on the drive lever then meshes with a drive gear on the capstan to return the drive lever and, through the interlocking lever, the pinch roller lever back to the tape stop mode in which the pinch roller is held out of contact with the capstan.

8 Claims, 6 Drawing Figures

MODE SELECTOR OF RECORDING AND/OR REPRODUCING APPARATUS

BACKGROUND OF THE INVENTION

1. Field of the Invention

The present invention relates to a mode selector device of a recording/playback apparatus such as a VTR and a tape recorder and, more particularly, to a mode selector device for selecting the tape stop mode and the tape drive mode.

2. Description of the Prior Art

In a recording/playback apparatus with a remote control system or feather-touch buttons, for allowing a pinch roller to tightly contact a corresponding capstan, a mechanism has been widely used in which the pinch roller is directly attracted by a plunger/solenoid. Although a mode selector device with the mechanism of this type is simple in construction as a whole, a number of large plunger/solenoids must be used, so that the space occupied by the large plunger/solenoids is increased to render the mode selector device large in size and to increase power consumption. Therefore, a portable or compact mode selector device cannot be manufactured.

In order to eliminate the above drawback, a device has been recently proposed which has a compact plunger/solenoid as a selecting means for storing the rotational force of the capstan or the like as the driving force and for switching the driving force to separate the pinch roller from the capstan or to allow the pinch roller to come in tight contact with the capstan upon deenergization or energization of the compact plunger/solenoid. However, in most of the conventional mode selector devices of this type, the switching operation and the storing operation of the driving force are simultaneously performed while the magnetic tape is being driven. A load on the capstan is thus increased, so that the selecting operation is time-consuming and the capstan is unstably rotated, resulting in irregular tape travel. That makes assemble editing difficult to perform.

SUMMARY OF THE INVENTION

It is, therefore, an object of the present invention to provide a mode selector device for selecting the tape drive mode and the tape stop mode without adversely affecting the tape travel.

It is another object of the present invention to provide a mode selector device which may be triggered with a compact plunger/solenoid.

In accordance with an aspect of the present invention, a stop/drive mode selector is provided for a signal recording and reproducing apparatus using a longitudinal magnetic tape driven by pinching between a pinch roller and a capstan rotated by a motor. The mode selector comprises a pivotally mounted pinch roller lever rotatably supporting the pinch roller for movement into and out of contact with the capstan. A drive gear is mounted for rotation by the motor and a pivotally mounted drive lever rotatably supports an eccentric gear for meshing with the drive gear. A drive spring is provided for pivoting the drive lever, and a locking lever, releasable by a solenoid plunger, is provided for locking the drive lever against the force of the drive spring in a first position that holds the eccentric gear away from the drive gear. When the locking lever is released, the drive spring rotates the drive lever toward a second position. An interlocking lever is pivoted at one end to the drive lever and is attached at the other end to the pinch roller lever through a cam mechanism. The cam mechanism interlocks the pinch roller lever and the drive lever to pivot the pinch roller lever into a tape drive mode, in which the pinch roller is urged against the capstan, in response to the pivotal movement of the drive lever from the first position by the drive spring and to stop the drive lever short of its second position in an intermediate position, in which the eccentric gear does not mesh with the drive gear. When the interlocking lever is pivoted about its one end, the cam mechanism is operable to pivot the pinch roller lever to separate the pinch roller from the capstan and to release the drive lever for rotation by the drive spring into its second position. In the drive lever's second position, the eccentric gear meshes with the drive gear to return the drive lever to its locked first position against the force of the drive spring.

In accordance with another aspect of the invention the locking lever and interlocking lever are actuated by an attraction lever. The attraction lever is mounted to a trigger lever for operation of the attraction lever. A trigger spring is provided for pivoting the trigger lever, and a holding lever holds the trigger lever against the trigger spring. A microsolenoid plunger operates the holding lever to release the trigger lever and operate the attraction lever. A reset eccentric gear on the trigger lever meshes with a flywheel gear on the capstan to return the trigger lever to its held position.

BRIEF DESCRIPTION OF THE DRAWINGS

The accompanying drawings show a mode selector device applied to a recording/playback apparatus such as a VTR and a tape recorder according to one embodiment of the present invention, in which.

DETAILED DESCRIPTION OF THE PREFERRED EMBODIMENT

Figure 1:
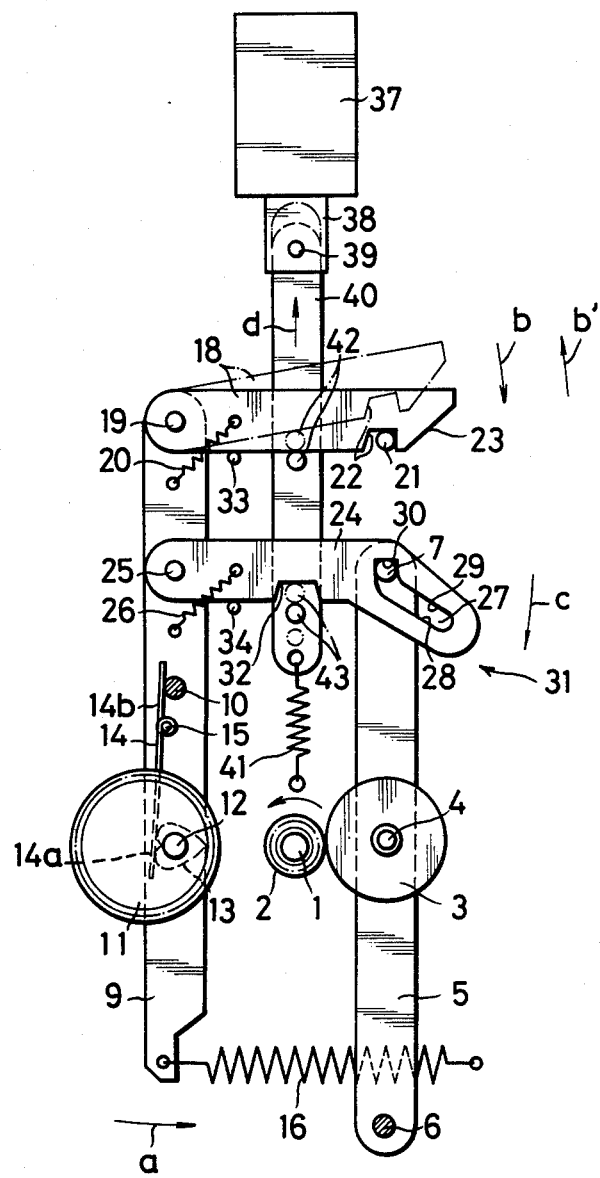
FIGS. 1 to 5 are plan views of a mode selector device for explaining the mode selecting operation.

Referring to FIGS. 1 to 5, a capstan 1 is constantly driven by a motor (not shown). A drive gear 2 is fixed on the capstan 1, so that the capstan 1 and the drive gear 2 rotate together. A pinch roller 3 selectively comes in tight contact with the capstan 1 and is separated therefrom. The pinch roller 3 is rotatably mounted on a shaft 4 which is fixed on a pinch roller lever 5. One end of the pinch roller lever 5 is pivotally mounted on a pivot pin 6, and the other end thereof has a pin 7 extending thereon. A drive lever 9 is pivotally mounted on a pivot pin 10 which is mounted substantially at the center thereof along its longitudinal direction. An eccentric gear 11 is mounted to mesh with the drive gear 2 and is eccentrically rotatably mounted through a shaft 12 on the upper side of the vicinity of one end of the drive lever 9. A heart-shaped cam 13 is formed integrally with the eccentric gear 11 on the lower surface of the eccentric gear 11 and around the shaft 12. A return spring 14 is wound around a pin 15 mounted on the drive lever 9. One end 14a of the return spring 15 is urged against the peripheral surface of the heart-shaped cam 13, and the other end 14b thereof abuts against the pivot pin 10. A drive spring 16 pivotally urges the drive lever 9 in the direction indicated by an arrow a so as to mesh the eccentric gear 11 with the drive gear 2. A locking lever 18 locks the drive lever 9 at a position where the eccentric gear 11 is spaced apart from the drive gear 2. One end of the locking lever 18 is pivotally mounted on the other end of the drive lever 9 through a pin 19. The locking lever 18 is also urged by a locking lever spring 20 to be pivotal in the direction indicated by an arrow b in FIG. 1. The spring 20 is hooked between the drive lever 9 and the locking lever 18. At the other end of the locking lever 18, a recess 22, comprising a lock portion, engageable with a fixed locking pin 21 and a tilt surface 23 extending from the recess 22 are formed. One end of an interlocking lever 24 is pivotally mounted through a pin 25 on the other end of the drive lever 9. The interlocking lever 24 is urged by a spring 26 to pivot in the direction indicated by an arrow c in FIG. 1. The spring 26 is hooked between the interlocking lever 24 and the drive lever 9. A cam groove 27 in which the pin 7 of the pinch roller lever 5 is fitted is formed at the other end of the interlocking lever 24. The cam groove 27 has a pair of cam tilt surfaces 28 and 29 and a recess 30 extending from one end thereof. The cam groove 27 together with the pin 7 constitutes a cam mechanism 31. A recess 32 is formed substantially at the center in the longitudinal direction of the interlocking lever 24. Stopper pins 33 and 34 are disposed to control pivotal movement of the locking lever 18 and the interlocking lever 24, respectively.

A plunger/solenoid or solenoid plunger 37 (to be referred to as a "plunger" for brevity hereinafter) is used as a trigger mechanism. An attraction lever 40 is connected to an attraction rod 38 through a pin 39. The attraction lever 40 is urged by a spring 41 to a returned position shown in FIG. 1. Pins 42 and 43 are mounted on the attraction lever 40 to respectively drive the locking lever 18 and the interlocking lever 24.

FIG. 1 shows the mode selector device in the stop mode. The pinch roller 3 is spaced apart from the capstan 1 and is locked in this state. At this time, the spring 16 is expanded, so that the driving force is retained therein. The locking lever 18 locks the drive lever 9 in a first position, shown in FIG. 1. The capstan 1 is driven by the motor counterclockwise or in the direction indicated by the arrow.

When the operator presses a PLAY or REC (recording) button, the plunger 37 is instantaneously excited, so that the attraction lever 40 is moved in the direction indicated by an arrow d to a position with the dot-dash line in FIG. 1 against the urging force of the spring 16. The locking lever 18 is pivoted by the pin 42 in the direction indicated by an arrow b' in FIG. 1 against the urging force of the spring 20 and is released from the locking pin 21. At this time, the pin 43 is fitted in the recess 32 of the interlocking lever 24, but does not allow pivotal movement of the interlocking lever 24.

Figure 2:
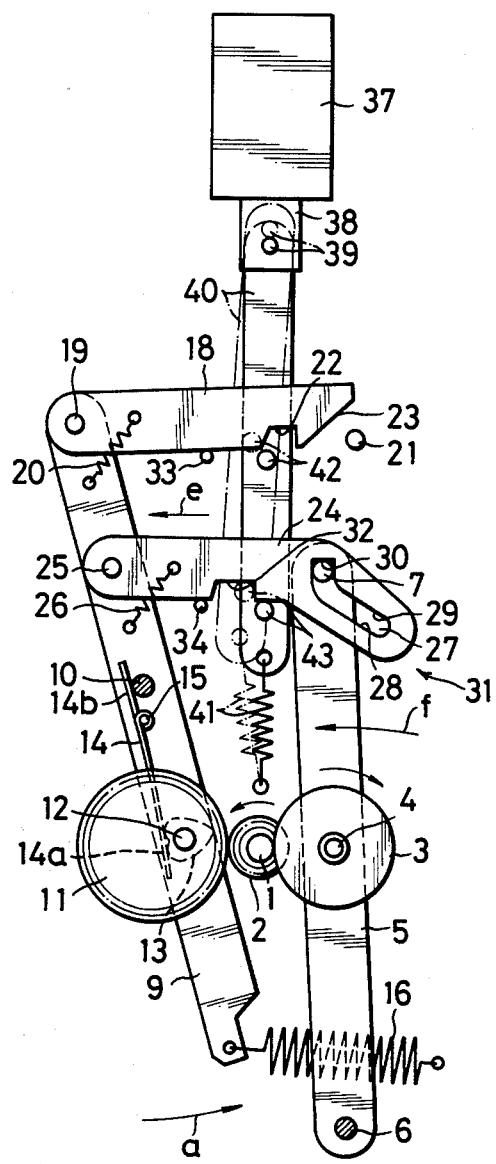

When the locking lever 18 is released, the drive lever 9 is simultaneously pivoted in the direction indicated by the arrow a in FIG. 2, and the interlocking lever 24 is attracted in the direction indicated by an arrow e in FIG. 2. At this time, the pin 7 of the pinch roller lever 5 is fitted in the recess 30 of the cam mechanism 31, so that the pinch roller lever 5 is pivoted through the pin 7 in the direction indicated by an arrow f. As a result, the pinch roller 3 comes in tight contact with the capstan 1 through a tape (not shown). The tape recorder or VTR is switched to the tape drive mode (playing or recording mode). Since the pinch roller 3 tightly contacts the capstan 1, movement of the pinch roller lever 5 in the direction indicated by the arrow f is interrupted. The pivotal movement of the drive lever 9 in the direction indicated by the arrow a is regulated by the pinch roller lever 5 to stop the drive lever 9 in an intermediate position, shown in FIG. 2. Therefore, the eccentric gear 11 is stopped immediately before it meshes with the drive gear 2 and does not mesh therewith. When the interlocking lever 24 is moved in the direction indicated by the arrow e, the attraction lever 40 is pivoted in the direction indicated by the dot-dash line in FIG. 2. However, when the plunger 37 is deenergized, the attraction lever 40 returns to the position indicated by the solid line in FIG. 2. As a result, the pin 43 abuts against or comes near the interlocking lever 24.

Figure 3:
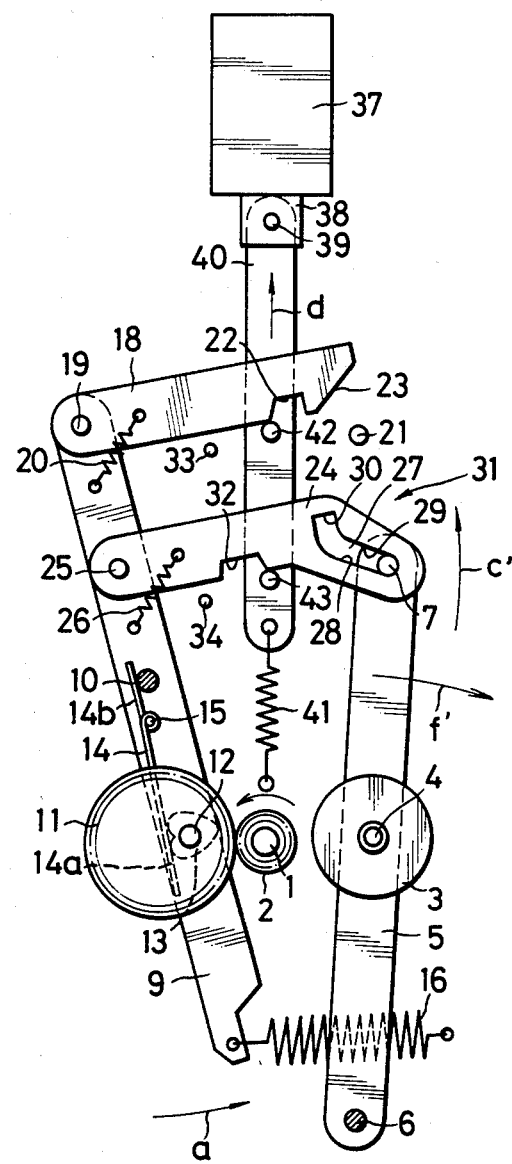

When the operator presses a stop button (not shown) in the tape drive mode shown in FIG. 2, the plunger 37 is attracted again to move in the direction indicated by the arrow d in FIG. 3 against the urging force of the spring 41. The interlocking lever 24 is pivoted by the pin 43 in the direction indicated by an arrow c' in FIG. 3 against the urging force of the spring 26. The pinch roller lever 5 is then pivoted in the direction indicated by an arrow f' in FIG. 3. Upon pivotal movement of the interlocking lever 24 in the direction indicated by the arrow c', the pin 7 is disengaged from the recess 30 of the cam mechanism 31 and is moved toward one end of the cam groove 27 of the cam mechanism 31. During this movement, the pin 7 is urged by the tilt surface 28 and is moved in the direction indicated by the arrow f'. The pinch roller lever 5 is then pivoted in the direction indicated by the arrow f' in FIG. 3, and the pinch roller 3 is separated from the capstan 1. As a result, the tape stop mode is initiated.

Figure 4:
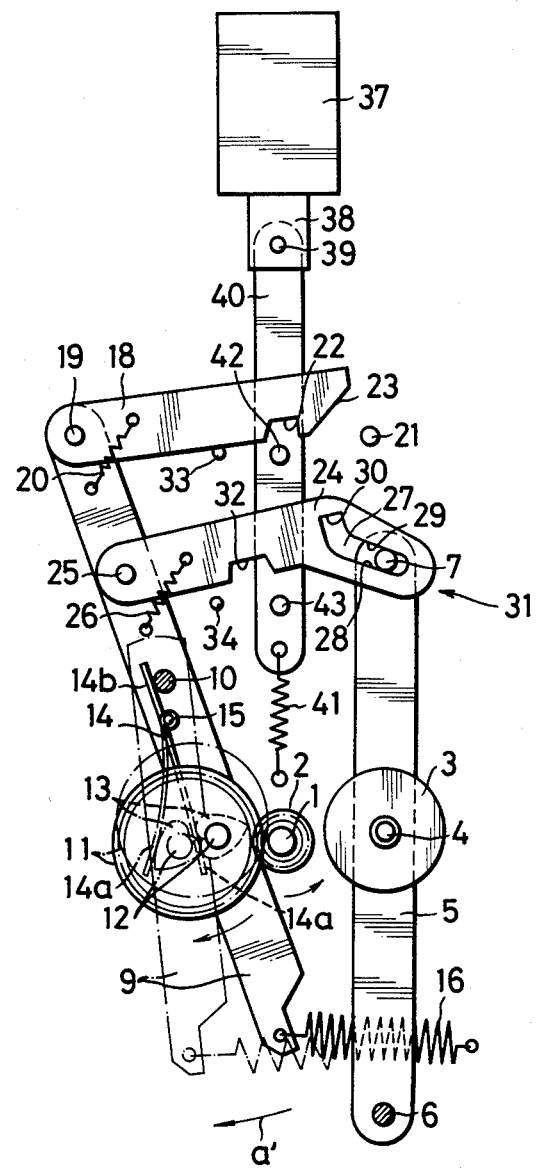

When the recess 30 of the interlocking lever 24 is disengaged from the pin 7, the locking state of the drive lever 9 is released. Simultaneously, the drive lever 9 is further pivoted in the direction indicated by the arrow a in FIG. 3 by the urging force of the spring 16. The drive lever 9 is thus freed for rotation into a second position, shown in FIG. 4. The eccentric gear 11 then meshes with the drive gear 2, as shown in FIG. 4. The meshing state is maintained by the spring 16, and the drive gear 2 pivotally drives the eccentric gear 11 in the direction indicated by the arrow. Upon eccentric movement of the eccentric gear 11, the drive lever 9 is pivoted through the shaft 10 to a position indicated by the dot-dash line in FIG. 4 along the direction indicated by an arrow a'. The spring 16 is then expanded to retain the driving force therein.

Figure 5:
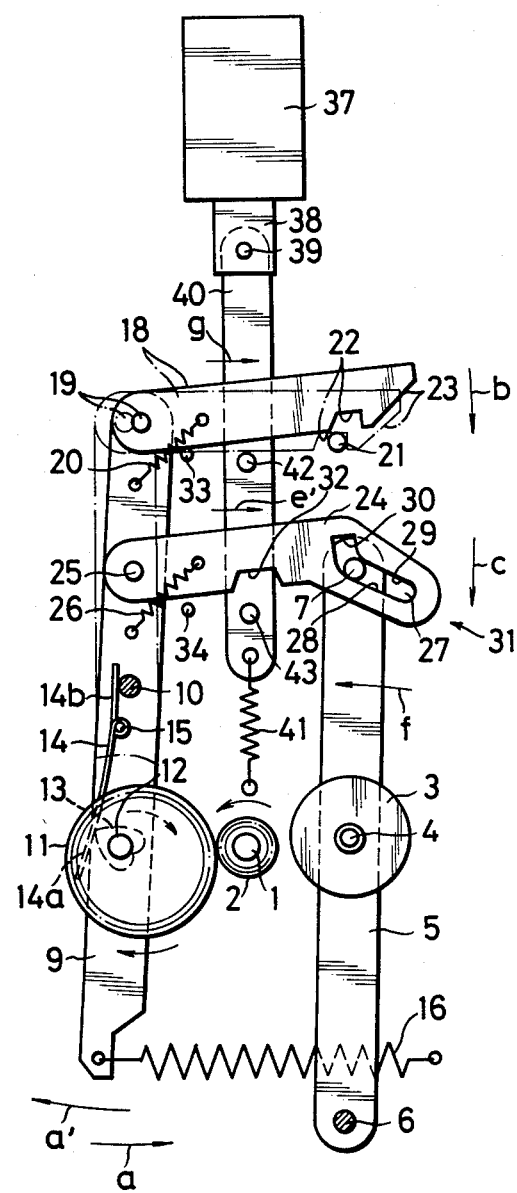

Upon pivotal movement of the drive lever 9 in the direction indicated by the arrow a', the locking lever 18 and the interlocking lever 24 respectively return by the springs 20 and 26 in the directions indicated by the arrows b and c in FIG. 5, while these levers are being urged in the directions indicated by arrows g and e' in FIG. 5, respectively. When the eccentric gear 11 is rotated through 180°, the drive lever 9 is pivoted to a farthest position along the direction indicated by the arrow a' in FIG. 5. The drive lever 9 then returns along the direction indicated by the arrow a upon further pivotal movement of the eccentric gear 11. When the eccentric gear 11 is rotated through 180°+α, the heart-shaped cam 13 is positioned as shown in FIG. 5. At this time, the pivotal force acts on the heart-shaped cam 13 in the direction indicated by the dotted arrow in FIG. 5 by the urging force of one end 14a of the return spring 14. The recess 22 of the locking lever 18 is engaged with the locking pin 21 as indicated by the dot-dash line in FIG. 5, when the drive lever 9 slightly returns along the direction indicated by the arrow a in FIG. 5. Thus, the drive lever 9 is locked. Thereafter, the eccentric gear 11 is continuously pivoted by the pivotal force acting on the heart-shaped cam 13 by the return spring 14, and is separated from the drive gear 2. As a result, the eccentric gear 11 returns to the rest position corresponding to the stop mode as shown in FIG. 1. In the stop mode, the heart-shaped cam 13 is stabilized by the return spring 14, whereby the eccentric gear 11 is retained in the position shown in FIG. 1. When the interlocking lever 24 is pivoted by the urging force of the spring 26 in the direction indicated by the arrow c in FIG. 5, the pin 7 of the pinch roller lever 5 is urged by the cam tilt surface 29 of the cam mechanism 31 and is moved in the direction indicated by the arrow f. Thus, the pin 7 is fitted in the recess 30, as shown in FIG. 1, and the tape drive mode is switched to the tape stop mode.

The operation of the mode selector device according to the present invention has been described above. The important factor in the present invention is that, when the tape drive mode is switched to the tape stop mode, the pinch roller 3 is separated from the capstan 1 to interrupt the tape travel and then the driving force is retained in the spring 16. On the other hand, when the tape stop mode is switched to the tape drive mode, the pinch roller 3 is brought in tight contact with the capstan 1 without increasing the load acting on the capstan 1. In this manner, since the mode switching mechanism is different from the driving force retaining mechanism, no load is imposed on the rotation of the capstan 1 at the switching from the tape drive mode to the tape stop mode, and vice versa. The tape travel is kept constant. Therefore, the tape travel will not be unstable when the tape is started or stopped. Although the driving force is retained in the spring 16 and a load on the capstan 1 is temporarily increased, the tape travel is not adversely affected even if the rotational frequency of the capstan 1 is temporarily decreased. A current flowing through the plunger 37 may be a pulsed current, resulting in low power consumption and providing a portable recording/playback apparatus. Further, since the plunger 37 moves the locking lever 18 or the interlocking lever 24, the number of plungers 37 may be decreased to one, thus providing a compact recording/playback apparatus.

Figure 6:
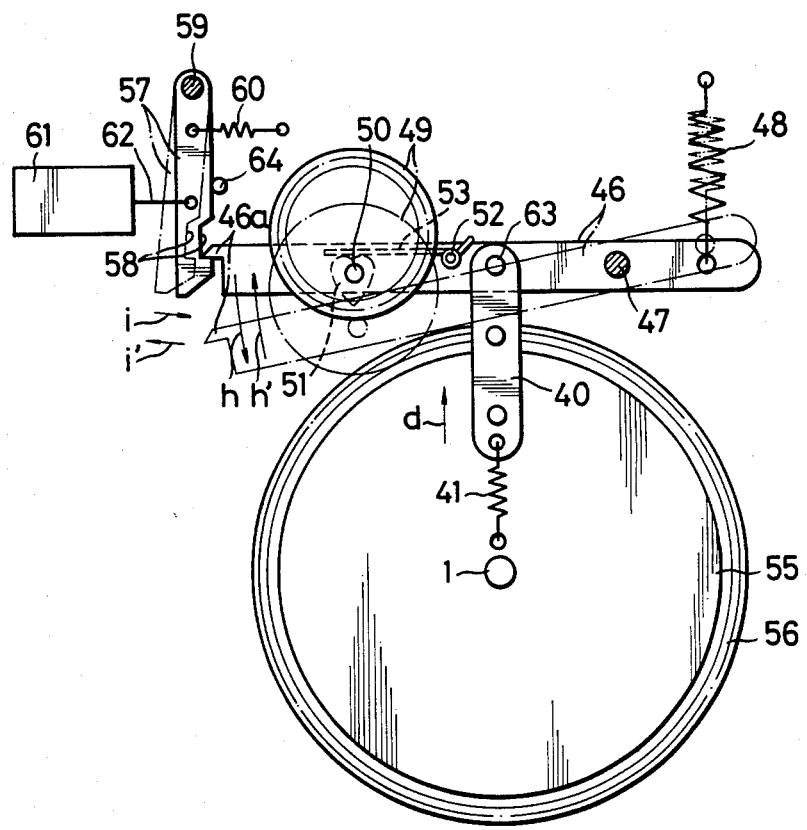
FIG. 6 is a plan view of a modification of a trigger mechanism used in the mode selector device shown in FIGS. 1 to 5.

FIG. 6 shows a modification of the trigger mechanism. A trigger lever 46 is urged by a trigger spring 48 to be pivotal about a pivot pin 47 in the direction indicated by an arrow h. A rest eccentric gear 49 is eccentrically rotatably mounted on the trigger lever 46 through a shaft 50. A return heart-shaped cam 51 is formed integrally with the eccentric gear 49 at the lower surface thereof. A return cam spring 53 which is mounted on a pin 52 extending on the trigger lever 46 urges the peripheral surface of the heart-shaped cam 51. A flywheel gear 56 is disposed on the periphery of a flywheel 55 fixed on the capstan 1. The eccentric gear 49 is free to mesh with the gear 56. A locking or holding lever 57 has a recess 58 which is engageable with a distal end 46a of the trigger lever 46 and is pivotal about a pivot pin 59. The locking lever 57 is urged by a spring 60 to be pivotal in the direction indicated by an arrow i. An attraction rod 62 of a microplunger/solenoid or microsolenoid plunger 61 (to be referred to as a "plunger" for brevity hereinafter) is connected to the locking lever 57. The attraction lever 40 is pivotally supported by the trigger lever 46 through a pin 63. A stopper pin 64 regulates pivotal movement of the locking lever 57.

According to the trigger mechanism with the above arrangement, when the operator presses a PLAY or REC button or a STOP button, the plunger 61 is instantaneously excited so that the locking lever 57 is pivoted against the urging force of the spring 60 in the direction indicated by an arrow i' so as to release the trigger lever 46. The trigger lever 46 is then pivoted by the urging force of the spring 48 in the direction in dictated by the arrow h to mesh the eccentric gear 49 with the gear 56. The eccentric gear 49 is eccentrically rotated by the gear 56. As a result, in the same manner as described with reference to the eccentric gear 11, while the eccentric gear 49 revolves once, the trigger lever 46 is pivoted against the urging force of the spring 48 in the direction indicated by an arrow h', and the attraction lever 40 is then moved against the urging force of the spring 41 in the direction indicated by the arrow d. When the trigger lever 46 is at a position indicated by the solid line, the distal end 46a engages with the recess 58 of the locking lever 57. Thus, the trigger lever is locked or held at this inactive position.

At the switching timing from the tape drive mode to the tape stop mode and vise versa, the load does not act on the capstan while it is rotated. Thus, the adverse effects are substantially eliminated when the tape is driven and an irregular tape travel does not occur. Further since the mode selection can be quickly performed, assemble editing can be highly precisely performed. Further, since a compact plunger/solenoid is used, a compact recording/playback apparatus with low power consumption can be obtained.

While the present invention has been particularly described with reference to certain preferred embodiments, it will be readily apparent that various changes and modifications in form and details may be made without departing from the spirit and scope of the invention be defined by the appended claims.

What is claimed is:

1. A stop/drive mode selector for a signal recording and reproducing apparatus using a longitudinal magnetic tape driven by pinching between a pinch-roller and a capstan rotatable by a motor, comprising:

a pivotally mounted pinch roller lever rotatably supporting said pinch roller for movement into and out of contact with said capstan;

a drive gear rotatable by said motor;

a pivotally mounted drive lever rotatably supporting an eccentric gear for meshing with said drive gear;

a drive spring for pivoting said drive lever;

a locking lever for locking said drive lever against the force of said drive spring in a first position separating said eccentric gear from said drive gear;

solenoid means operative for releasing said locking lever and thereby permitting said drive spring to pivot said drive lever toward a second position;

an interlocking lever, pivoted at one end to said drive lever; and a cam mechanism through which the other end of said interlocking lever is attached with said pinch roller lever for interlocking said pinch roller lever and said drive lever to pivot said pinch roller lever from a tape stop mode into a tape drive mode, wherein said pinch roller is urged against said capstan, in response to the pivotal movement of said drive lever from said first position by said drive spring and to stop said drive lever short of said second position in an intermediate position wherein said eccentric gear does not mesh with said drive gear, said cam mechanism being operable, when said interlocking lever is pivoted about said one end, to pivot said pinch roller lever to separate said pinch roller from said capstan and to release said drive lever for rotation into said second position by said drive spring, wherein said eccentric gear meshes with said drive gear to return said drive lever to said locked first position against the force of said drive spring.

2. A mode selector according to claim 1, wherein said eccentric gear includes a heart-shaped cam and said drive lever includes a return spring cooperating with said cam for urging said eccentric gear into a rest position when it is not meshed with said drive gear.

3. A mode selector according to claim 2, wherein said locking lever includes a lock portion for locking said locking lever to hold said drive means in said first position.

4. A mode selector according to claim 3, further comprising a locking lever spring for biasing said locking lever into a locking position.

5. A mode selector according to claim 1, further comprising an attraction lever for operation intermittently by a solenoid plunger selectively to release said locking lever and to pivot said interlocking lever about said one end.

6. A mode selector according to claim 5 further comprising:
  a flywheel gear rotatable by said motor;
  a pivotally mounted trigger lever having said attraction lever mounted thereto for operation of said attraction lever by the pivoting of said trigger lever;
  a reset eccentric gear mounted to said trigger lever for meshing with said flywheel gear;
  a trigger spring for pivoting said trigger lever; and
  a holding lever, operable by a microsolenoid plunger, for holding said trigger lever in an inactive position, wherein said reset eccentric gear does not mesh with said flywheel gear, and, when said microsolenoid is activated, for releasing said trigger lever for rotation by said trigger spring to operate said attraction lever, wherein said eccentric gear meshes with said flywheel to return said trigger lever for holding in said inactive position by said holding lever.

7. A mode selector according to claim 6 wherein said reset eccentric gear includes a heart-shaped return cam and said trigger lever includes a return cam spring cooperating with said return cam for urging said reset eccentric gear into a rest position when it is not meshed with said flywheel gear.

8. A mode selector according to claim 7 further comprising a microsolenoid requiring low operating power for operation of said holding lever.

* * * * *